UNITED STATES PATENT OFFICE.

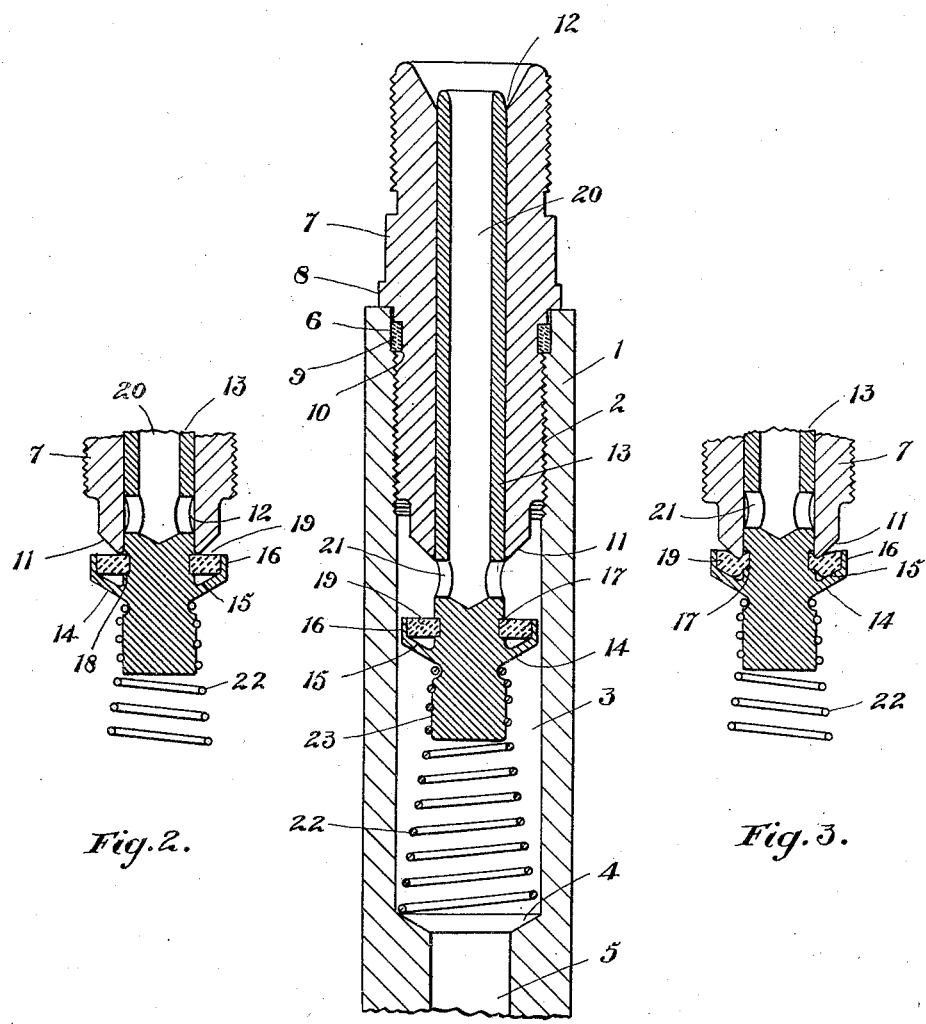

WILLIAM CHARLES MEAD, OF TORONTO, ONTARIO, CANADA.

AIR-VALVE.

1,351,780.  Specification of Letters Patent.  Patented Sept. 7, 1920.

Application filed June 14, 1920. Serial No. 388,757.

*To all whom it may concern:*

Be it known that I, WILLIAM CHARLES MEAD, a subject of the King of Great Britain, and resident of the city of Toronto, county of York, Province of Ontario, in the Dominion of Canada, have invented certain new and useful Improvements in Air-Valves, described in the following specification and illustrated in the accompanying drawings, that form part of the same.

The principal objects of this invention are to produce a valve particularly adapted for use in automobile tires which will form an effective seal and prevent the leakage of air therefrom and will be maintained air tight through the effect of the pressure within the tire and will not be liable to get out of order.

The principal feature of the invention consists in the novel construction of the valve member and the arrangement of the sealing washer whereby a tubular stem, slidably arranged in the valve body and having lateral openings to allow the flow of air past the valve seat, is formed with a cupped end adapted to hold a gasket in position to engage a tapered valve seat to effect the air tight closing of the valve.

In the drawings, Figure 1 is an enlarged longitudinal sectional view of my improved form of valve in the open position.

Fig. 2 is a sectional detail showing the valve member just engaging the valve seat and Fig. 3 is a sectional detail showing the relation of the parts when the valve is fully closed.

The valve body 1 is formed with an internal thread 2 at the upper end and a recess 3 terminating in a shoulder 4, said recess communicating with the passage 5 extending through the valve body.

A counter bore 6 is formed at the upper end of the threaded orifice 2. A member 7 is threaded into the orifice 2 having a shoulder 8 adapted to abut the top of the body portion and a gasket 9 is arranged in the counter bore of the body to engage a correspondingly counter bored portion 10, of the member 7.

The upper end of the member 7 is threaded to receive a suitable valve cap. The inner end of the member 7 is formed with a tapered surface 11 which forms the valve seat and a central orifice 12 extends through the member 7 from top to bottom.

The valve member comprises a tubular stem 13 which is a sliding fit in the orifice 12. At the lower end this valve stem is formed with a cup shaped portion 14, the inner bottom surface 15 of which is tapered toward the stem at a flatter angle than the angle of the valve seat 11 and an outer cylindrical wall 16 surrounds the tapered recess.

An annular recess 17 is cut in the wall of the stem, it being preferably in substantially horizontal alinement with the cylindrical wall 16 and the bottom edge 18 thereof is raised slightly above the bottom of the tapered inner surface 15 of the cup.

A rubber gasket 19 is fitted within the cup, the inner edge thereof entering the recess 18 in the stem. The washer is thus retained in a horizontal position and is spaced from the tapered bottom of the cup when it is not under pressure.

The central orifice 21 through the tubular stem 13 opens outwardly to the side walls of the tube above the cup through the holes 21.

A spiral spring 22 rests upon the shoulder 4 within the valve body and encircles the end 23 of the valve stem and holds the valve stem upwardly with the gasket 19 engaging the seat 11.

The applicant is aware of the use of hollow valve stems having lateral openings above a head supporting a gasket to engage against a valve seat but the present invention differs from the known devices in that the gasket is confined within a cup and is brought into engagement with the edge of a tapered valve seat. The gasket is retained in a horizontal position as described when not under pressure but upon coming into contact with the edge of the seat 11 it is forced downwardly into the tapered pocket so that an absolute seal is effected to prevent the escape of air. The extraordinary sealing effect obtained is largely due to the tapered inner surface of the valve head being formed at a flatter angle than is the tapered surface of the valve seat causing the rubber gasket to be crowded or spring outwardly as the valve seat presses into the rubber. This spreading action of the rubber presents a larger surface to the valve seat and also causes a "hugging" effect which of course increases the sealing effect.

It is important to note that as the valve gasket is supported horizontally within the confines of the cup and is held by the retaining wall 16 and that the bottom of the cup recedes from the gasket and forms an air space. This air space provides a cushion which eases the pressure against the rubber and allows the gasket to spring downwardly and to fit around the valve seat to very effectively close the air passage.

It will be noted that any tendency for the air to get between the valve and the seat 11 will result in it forcing under the gasket to the space underneath same but this will only force the gasket into closer contact with the seat.

This form of valve has been thoroughly tested commercially and is found to be very effective.

What I claim as my invention is:—

1. In an air valve, a valve seat having a tapered surface and an opening through the center, a valve having a tubular stem extending through said central opening and provided with lateral openings adapted when the valve is pushed inwardly to move beyond the valve seat to permit the free flow of air having a cup-shaped inner end formed with a tapered bottom inner wall, and a gasket supported from the outer perimeter of the tapered bottom and in perpendicular relation to the stem of the valve, said gasket being adapted to engage the tapered valve seat and to be depressed into the tapered head of the valve.

2. In an air valve, a tapered seat having a central opening, a hollow valve stem sliding in said opening and having lateral orifices through which the air is permitted to pass when the valve moves inwardly, a cup formed on said stem below said orifices, said cup having a cylindrical outer wall, and a bottom tapering inwardly from said wall at a flatter angle than the taper of the valve seat, an annular recess in said stem having its bottom edge spaced above the bottom of the tapered bottom of the cup, and a gasket fitting into said annular recess and retained by the outer wall in a position substantially perpendicular to the vertical axis of the valve, being spaced from the inner surface of the bottom of the cup.

WILLIAM CHARLES MEAD.